United States Patent [19]
Johansson

[11] 3,899,473
[45] Aug. 12, 1975

[54] METHOD OF INCORPORATING SOLID ADDITIVES INTO VINYL CHLORIDE POLYMERS

[75] Inventor: Bernt Eric Johansson, Domsjoverken, Sweden

[73] Assignee: Kemanord AB, Stockholm, Sweden

[22] Filed: Mar. 10, 1972

[21] Appl. No.: 233,740

[52] U.S. Cl.... 260/92.8 W; 260/23 XA; 260/42.49; 260/42.53; 260/45.7 S; 260/45.75 R; 260/78.5 R; 260/86.3; 260/87.1; 260/87.5 R; 260/884
[51] Int. Cl. ............................................. C08f 1/84
[58] Field of Search ................ 260/87.5 R, 92.8 W

[56] References Cited
UNITED STATES PATENTS
3,151,103    9/1964    Heckmaier et al. ............... 260/92.8

FOREIGN PATENTS OR APPLICATIONS
1,559,139    3/1969    France ............................. 260/87.5
1,073,455    6/1967    United Kingdom ................ 260/87.5

Primary Examiner—Stanford M. Levin
Attorney, Agent, or Firm—Fred C. Philpitt

[57] ABSTRACT

The present invention relates to a method of incorporating solid additives into vinyl chloride polymers. More precisely the invention relates to a method of incorporating said additives during the polymerization process which is commenced as a mass polymerization and completed as a suspension polymerization.

2 Claims, No Drawings

METHOD OF INCORPORATING SOLID ADDITIVES INTO VINYL CHLORIDE POLYMERS

BACKGROUND

Vinyl chloride polymers are widely used in the manufacture of shaped articles and their employment ranges over almost all application fields. Occasionally the polymers alone are used in the shaped articles. However, the polymers are usually admixed with various additives such as thermo stabilizers, light stabilizers, lubricants, pigments, processing aids, fillers, etc., in order to provide the shaped articles with particular properties. Several of these additives are in the form of solids. The solid additives are usually added during the processing of the finished polymer, i.e., by means of mechanical mixing at an elevated temperature. In many cases difficulties are involved in achieving a satisfactory dispersion of the solid additives in the molten polymer within a reasonable period of time. For economical reasons and because of the thermal sensitivity of the polymers it is essential that the kneading time at the processing temperature not be prolonged unnecessarily. It has even been proposed to blend solid additives during the polymerization process itself. In Swedish Pat. No. 322,910 and Belgian Pat. No. 709,211 solid additives are incorporated into the polymer durng the polymerization process by means of various techniques. These techniques suggest that the solid additives must be introduced into the monomer phase by addition of a surface active agent to the polymerization mixture.

THE PRESENT INVENTION

The present invention involves the discovery that the retention of the solid additives in the polymers can be improved if the polymerization process is commenced with a mass polymerization stage in which the solid additives are dispersed in the monomer phase to a conversion of 20%, whereafter water and the remaining water-soluble polymerization aids are added in order to complete the polymerization process to the degree of conversion desired by suspension polymerization.

The proportion of the polymerization process conducted as mass polymerization can represent up to 20% of the total conversion. The degree of conversion which is chosen depends on the solid additive used since different times are required for mass polymerization in different systems to secure a good retention of the solid additives in the polymer. Certain additives such as lead stearate do incorporate into the polymer even if the mass polymerization stage is a minor one. Other additives, such as the inorganic fillers, require that the mass polymerization be conducted to a degree of conversion of 5-10% in order to achieve complete retention. A mass polymerization stage has been conducted according to the present invention when the monomer or monomers had been maintained at polymerization conditions for 15 minutes in the presence of solid additives, initiators and other vinyl chloride soluble substances in the absence of water. In order to avoid undesired crust formation in the polymerization vessel when conducting a combined mass and suspension polymerization, it is usually preferable to conduct the dispersion obtained from the mass polymerization stage to a separate vessel before commencing the suspension polymerization stage.

According to the present method vinyl chloride homopolymers or copolymers are obtained in which the solid additives are very well dispersed and show a superior retention in the polymer. The polymers obtained have a particle size and porosity that make them suitable for the manufacture of shaped articles. The mechanical properties of the compositions in general correspond to the properties obtained from compositions into which solid additives were incorporated according to other methods. The method of the present invention is economically favorable because there is no need for either expensive chemicals or costly process equipment.

By "solid additives" according to the present invention I mean additives having an average particle size within the range of from about 0.01 - 20 $\mu$m, which particles can be of inorganic or organic nature. The particles are generally insoluble in both (a) water and monomer or (b) monomer mixtures.

The additives which according to the present invention can be incorporated into the vinyl chloride polymer as solid additives can be of various types and the amount added to a great extent depends on the purpose to be achieved by the additives. Thus, quantities of additives within the range of 0.1 - 10% by weight based on the monomer or the monomer mixture can be normal when pigments or stabilizers of various kinds are introduced. Other types of solid additives such as fillers, e.g., kaolin, chalk, titanium dioxide, etc., may be added in much greater amounts up to 70% by weight based on the monomer or monomer mixture. The mechanical properties of polymers containing large amounts of solid additives are in general not satisfactory for the manufacture of shaped articles, but such polymers are very useful as master batch, i.e., polymers which at compounding are mixed with other unmodified polymers and other processing aids. According to the method of the present invention 10–60% by weight of solid additives can be introduced in a polymer.

The size of the particles of the solid additives can vary. Commonly the average diameters are in the range of from 0.01 - 20 $\mu$m. Since it generally is desirable to obtain the main part of the polymer in a particle size within the interval of 50 - 100 $\mu$m, solid additives having a particle size below 5 $\mu$m are preferred. However, the lower limit is not critical. However, many additives having a particle size below 0.05 $\mu$m tend to have a viscosity increasing effect in the organic solvent, which means that additives of this type have to be chosen in small amounts.

Pigments employed according to the present invention may be of organic or inorganic structure. They may be added in the form of a pre-dispersed paste if the substance in which they are dispersed is soluble in vinyl chloride or in any of the included comonomers. Suitable inorganic pigments comprise titanium dioxide and other metal oxides, chromate of lead, zinc, Prussian blue, sulphides, etc. Carbon black of various qualities can be used. Of the suitable organic pigments there may be mentioned copper phthalocyanine, diazopigments, indanthrone and flavathrene derivatives, kinakridones, etc.

By fillers according to the invention I mean fine grained inorganic substances that are substantially insoluble in water or in organic compounds. They can be finely milled natural minerals or synthetically made substances. As examples can be mentioned silicon dioxide, silicate minerals (such as kaolin, asbestos, talcum, etc.) aluminum oxide, and calcium carbonate.

Suitable stabilizers for solid additives to be used in accordance with my invention would include salts of lead, cadmium, barium, and particularly their stearates, sulphates, of carbonates. Salts of organic acids sometimes have a certain surface activity influencing the size of the polymer particles and their porosity. In such cases a moderate quantity of said stabilizers is added, preferably less than 1% by weight based on the monomer or monomers.

The incorporation of stabilizers during the polymerization process can sometimes be associated with difficulties. Certain of these compositions have a retarding or even an inhibiting effect on the polymerization process. It is not suitable to add inhibiting additives when commencing the polymerization process and they are not employed when conducting the method according to the present invention. Additives not recommended for the suspension polymerization of vinyl chloride are well known to those skilled in the art.

When hydrophilic solid additives are used in the thermoplastic compositions those that are chosen frequently have their surface coated so that the surface properties are fitted to the mode of application. Thus by imparting hydrophobicity the dispersability of a finely milled solid in an organic solvent can be increased. Imparting hydrophobicity can be achieved by coating with fatty acids or other surface active agents, preferably in an organic solvent. Coupling agents can also be used in order to create a strong bond between the polymer and the solid additive. Such coupling agents include compounds which comprise a functional group forming a strong bond to the solid additive in question and to a group which can participate in the polymerization process or curing reaction. As examples of suitable coupling agents the following compounds can be mentioned: glycidyl methacrylate, acrylic acid, maleic acid anhydride, semi-esters and semi-amides of maleic acid or fumaric acid, vinyl isocyanate, $\gamma$-methacryloxypropylotrimethoxysilane, etc.

A particular object of the present invention is to enable surface coating of the solid additives in situ while they are dispersed in the monomer or the monomer mixture. This is achieved by introducing into the mixture of solid additives and monomer or monomers up to 20% by weight, preferably up to 10% by weight based on the solid additives, of one of the compounds mentioned in the preceding paragraph which can be adsorbed by or chemically react with the surface of the solid additives. This compound is preferably a coupling agent which can react chemically with the additives. The best results are obtained when this coupling agent is an ethylenically unsaturated compound which can be copolymerized with vinyl chloride, e.g., the unsaturated compounds mentioned in the preceding paragraph. When conducting the polymerization according to my invention the monomer mixture consists of vinyl chloride and up to 30% by weight based on the vinyl chloride of other monomers that are copolymerizable with the vinyl chloride. Such other monomers are for example vinyl esters, particularly vinyl acetate, esters and amides of acrylic acid, methacrylic acid, maleic or fumaric acid, alkyl vinyl ethers, -olefins, di-, tri- or tetrachloroethylene, etc. Especially important are such monomers which also can function as coupling agents. The monomer mixture can also contain up to 10% by weight of monomer soluble additives. Such additives are for instance plasticizers and organic solvents. Furthermore elastomers such as homopolymers of vinyl acetate and alkyl acrylates and copolymers of these monomers with ethylene can be included in the mixture.

The polymerization according to the present invention is conducted with an initiator soluble in the monomer or in the monomer mixture. The type and quantity of initiator will depend on the polymerization rate which is considered to be sufficient. Preferably peroxy-compounds of the type $R-OO-R_1$ are used wherein $R$ and $R_1$ can be equal or different and indicate hydrogen, alkyl-, acyl- or carbalkyloxy-groups. Also azo-compounds such as azobis-isobutyronitrile are suitable. Mixtures of initiators may also be used. A preferred mixture of initiators is a diacylperoxide and a dialkyl peroxydicarbonate. The quantity used in general will be within the range of 0.005 – 2% by weight based on the monomer or monomers.

The polymerization temperature is not critical but commonly it is within the ranges employed for mass or emulsion polymerization suitably 0° – 70° C respectively 30° – 70° C, and preferably 30° – 65° C respectively 45° – 65° C.

Since the present invention refers to a method of incorporating solid additives into the vinyl chloride polymer during the polymerization process itself, it becomes evident to those skilled in the art that various types of additives in the form of solid additives can be varied within a wide range. Furthermore, it is evident that the polymerization conditions can be varied within the limits known for conventional mass and suspension polymerizations.

EXAMPLES

The following examples are illustrative of some preferred embodiments of the present invention. It should be understood that these examples are not intended to limit the invention and that obvious changes may be made by those skilled in the art without changing the essential characteristics and the basic concept of the invention. The parts and percentages are by weight, the temperature is room temperature and the pressure is atmospheric, unless otherwise indicated.

EXAMPLE 1

Two polymerization tests were carried out with wollastonite (CAB-O-LITE P 4, having a particle size of about 5 $\mu$ from Cabot Corp. USA) as the solid additive:

1A. A 14 l autoclave was charged at a temperature of 23° C with 1,500 g wollastonite, 7,000 ml distilled water, 75 g acrylic acid, 600 g of a 1% solution of methylhydroxy propyl cellulose, 300 g of a copolymer ethylene/vinyl acetate (46% vinyl acetate), 8 g sodium acetate and 4 g azo-bis-isobutyronitrile in the order mentioned. The autoclave was heated to 45° C and connected to a vacuum pump for 15 minutes in order to remove all oxygen. The autoclave then was cooled to 35° C and charged with 4,500 ml vinyl chloride. The mixture was then stirred for 2 hours so that all components would dissolve and then the mixture was heated to the polymerization temperature of 60° C. After 5.5 hours the pressure has dropped to 5 kg/cm² and the polymerization was discontinued.

1B. A 14 l autoclave was charged at a temperature of 23° C with 1,000 g wollastonite, 200 g of a copolymer of ethylene/vinyl acetate (45% vinyl acetate), 50 g acrylic acid, and 2.0 g azo-bis-isobutyronitrile. The autoclave was flushed four times with small quantities of vinyl chloride to remove the oxygen. 3,000 ml vinyl chloride were charged and the mixture was allowed to polymerize at a temperature of 60° C. After 1 hour of mass polymerization 600 ml of a.1% solution of methylhydroxypropylcellulose were added containing 8 g of sodium acetate and 8,000 ml distilled water (freed from oxygen by means of purging with nitrogen). After a further 6.5 hours at a temperature of 60° C the pressure was dropped to 5 kg/cm$^2$ and the polymerization was discontinued.

The polymers produced by 1A and 1B were washed, dried and analysed. The chlorine content was determined and indicated in percent of the chlorine content of pure PVC. For comparison the theoretical content of PVC was calculated if retention was complete. Further, the flexural strength was measured at a temperature of +23° C of the test specimens of which small sheets were made by pressing for 10 minutes at 170° C. The following results were obtained:

| Test specimen | 1A | 1B |
|---|---|---|
| Chlorine analysis (% by weight PVC) | 89.2 | 62.4 |
| d:o theoretical value | 68.5 | 60.5 |
| difference | 20.7 | 1.9 |
| Flexural strength kp/cm$^2$ | 22,000 | 46,000 |

When the wollastonite was dispersed in the aqueous phase it was very incompletely incorporated into the polymer. A good retention was obtained when the wollastonite was dispersed in vinyl chloride followed by a period of mass polymerization according to the invention. Apart from the chlorine analysis the wollastonite content is evident from the mechanical properties of the test-specimens such as their flexural strength.

EXAMPLE 2

Four polymer tests were carried out with pulverous aluminum oxide (Martoxin from Martinwerke GmbH) as a solid additive. The particle size was approximately 0.5 μ. The tests were carried out as follows:

2 A. A 14 l autoclave was charged at a temperature of 23° C with 1,200 g Al-oxide, 7,000 ml distilled water, 60 g acrylic acid, 600 ml of a 1% solution of methylhydroxypropyl cellulose and 4 g azo-bis-isobutyronitrile in the order mentioned. The autoclave was heated to a temperature of 45° C and connected to a vacuum pump for 15 minutes to remove the oxygen. 4,500 ml vinyl chloride were charged and the autoclave was then heated to a polymerization temperature of 60° C. After 8 hours the pressure has dropped to 5 kg/cm$^2$ and the polymerization was discontinued.

2 B. A 14 l autoclave was charged with the solid additive, i.e., 800 g aluminum oxide and then with 2 g azo-bis-isobutyronitrile. The autoclave was flushed four times with small quantities of vinyl chloride to remove the oxygen. Thereafter 2,000 ml of vinyl chloride and 40 g acrylic acid were charged which were washed with additional 1,000 ml of vinyl chloride. The autoclave content was stirred at a temperature of 25° C for 1 hour. 900 ml of a 1% solution of methylhydroxypropylcellulose and 7500 ml distilled water were then added which have been freed from the oxygen. The temperature was then raised to 60°C and maintained at this level. 8 hours later the pressure in the autoclave had fallen to 5 kg/cm$^2$ and the polymerization was discontinued.

2 C. The process according to 2 B was repeated but instead of stirring at 25° C and adding water and a protective colloid, the monomer mixture and the aluminum oxide were heated to 60°C and mass polymerization was conducted at this temperature for 30 minutes. Water and the protective colloid then were added and the polymerization was terminated as a suspension polymerization after 7.5 hours.

2 D. This polymerization was identical with that of 2 C but the mass polymerization stage was conducted for 60 minutes.

The four polymers were tested in the same manner as mentioned in Example 1. The following results were obtained:

| Test Specimen | 2 A | 2 B | 2 C | 2 D |
|---|---|---|---|---|
| Chlorine analysis (% by weight of PVC) | 95.2 | 86.9 | 76.1 | 77.0 |
| d:o theoretical value | 76.4 | 76.2 | 76.2 | 76.2 |
| difference | 18.8 | 10.7 | 0.1 | 0.8 |
| Flexural strength, kp/cm$^2$ | 35,000 | 40,000 | 55,000 | 55,000 |

A satisfactory retention of the aluminum oxide was only achieved when mass polymerization was employed. The aluminum oxide was well dispersed in the composition.

EXAMPLE 3

Four polymerizations were carried out with fine granular calcium carbonate (Purecal U from Wyandotte, having a particle size of about 0.04 μ). Different polymerization systems were employed:

3 A. A 14 l autoclave was charged at a temperature of 52° C with 1,050 g calcium carbonate, 8,000 ml distilled water, 6 g sorbitan monolaurate and 6 g lauroyl peroxide in the order mentioned. The autoclave was flushed with small quantities of vinyl chloride to remove the oxygen. 300 ml of a 1% solution of methylhydroxypropylcellulose were added and then 4,500 ml vinyl chloride were charged. The temperature was raised to 65° C while stirring and after 7.5 hours the suspension polymerization was discontinued.

3 B. A 14 l autoclave was charged with 690 g calcium carbonate and then with 2 g azo-bis-isobutyronitrile. Air was removed from the autoclave. 3,000 ml vinyl chloride then were charged and the autoclave contents were stirred at 25° C for 1 hour. 900 ml of a 1% solution of methylhydroxypropyl cellulose and 7,500 ml distilled water freed from air were introduced. The temperature was raised to 60° C and maintained at this level while stirring. 8 hours later the pressure had fallen to 5 kg/cm$^2$ and the polymerization was discontinued.

3 C. A 14 l autoclave was charged with 690 g calcium carbonate and then with 2 g azo-bis-isobutyronitrile. The autoclave was flushed four times with small quantities of vinyl chloride to remove oxygen. 3,000 ml vinyl chloride were then charged and the mixture was heated to 60° C, conducting the mass polymerization at this temperature for 60 minutes. Water and the protective colloid were then added and the polymerization was terminated as a suspension polymerization after 7.25 hours.

3 D. This polymerization was identical with 3 C, but 14 g of stearic acid were added immediately after adding the calcium carbonate.

3 E. This polymerization was identical with 3 C, but 18 g lead stearate were added immediately after the charging of the calcium carbonate. The polymerization lasted for 10 hours.

The polymers were tested in the same manner as described in Example 1. The following results were obtained:

| Test specimen | 3 A | 3 B | 3 C | 3 D | 3 E |
|---|---|---|---|---|---|
| Chlorine analysis (% by weight of PVC) | 96.7 | 80.9 | 78.9 | 79.6 | 79.0 |
| d:o theoretical value | 79.3 | 79.7 | 79.7 | 79.7 | 79.7 |
| difference | 17.4 | 1.2 | 0.8 | 0.1 | 0.7 |
| Flexural strength kp/cm² | 32,000 | 41,000 | 40,000 | 40,000 | 40,000 |

When the polymerization was conducted according to examples 3 C, D and E, very good retention of the filler was obtained which mainly can be traced in the pores of the polymer particles. This can be studied by electron micrography when making a thin section of a polymer particle. The good retention becomes evident primarily in comparison with a polymer the solid additives of which have not been dispersed in a monomer phase prior to the conventional suspension polymerization, but the retention is improved also in comparison with those polymers the solid additives of which have first been dispersed in the monomer phase prior to adding water and the protective colloid for conducting the suspension polymerization.

EXAMPLE 4

A 1.6 l autoclave with glass wall was charged with 30 g of hydrophobic silicon oxide having a particle size of about 0.02 μ (Aerosil R-972 from Degussa) and 0.8 g lauroyl peroxide. A small amount of vinyl chloride was added and flushed in order to remove the oxygen from the autoclave and 425 ml vinyl chloride then was added. The temperature was raised to 50° C and the mass polymerization was conducted at said temperature for one hour. The viscosity of the contents of the autoclave was high. After mass polymerization was completed the following ingredients were added in the order denominated : 14 ml of a 5% solution of sorbitan monolaurate, 300 ml of a 1% aqueous solution of methylhydroxypropyl cellulose and distilled water (freed from oxygen) to a total volume of 1.4 l. The temperature was raised to 65° C and the suspension polymerization was continued until the pressure dropped to 5 kg/cm².

The polymer obtained had a chlorine content which was 92.0% of pure PVC. The expected chlorine content was 92.8%, consequently the retention of the silicon dioxide powder must be considered a high one.

EXAMPLE 5

300 g white pigment (Kronos RNCX) and 3 g azo-bis-isobutyronitrile were charged into a dry 14 l autoclave. The oxygen was flushed out by means of small amounts of vinyl chloride. 2,000 ml vinyl chloride were then charged, after that 6 g crotonyl alcohol in 500 ml vinyl chloride and additional 500 ml vinyl chloride. The autoclave was heated to 60° C and the mass polymerization carried out for 60 minutes at said temperature. 1,000 ml of a 1% aqueous solution of methylhydroxypropyl cellulose, 500 ml of a 1% solution of polyvinyl alcohol with 12% acetate groups and 7.5 kg distilled water were then charged. The polymerization was discontinued after 8 hours.

A microscopic test revealed that all polymer particles did contain pigment. When the resin was mixed with suitable stabilizers and sheeted at 170° C, an evenly white colored sheet was obtained.

EXAMPLE 6

100 g carbon black (Monarch 71 from Cabot Corp.) and 3 g of azo-bis-isobutyronitrile were charged into a dry 14 l autoclave. The oxygen was flushed from the autoclave by means of small amounts of vinyl chloride. 3,000 ml vinyl chloride were then charged and the autoclave was heated to 60° C. At said temperature the mass polymerization was carried out for 2 hours, the protective colloid then was added: 6 g methylhydroxypropyl cellulose and 3 g polyvinyl alcohol (12% acetate groups), both as a 1% aqueous solution. 7.5 kg distilled water was introduced and the polymerization continued as suspension polymerization for 7 hours. The polymer was sheeted at 170° C to an evenly black colored sheet.

CONCLUSION

More or less detailed claims will be presented hereinafter and even though such claims are rather specific in nature, those skilled in the art to which this invention pertains will recognize that there are obvious equivalents for the specific materials recited therein. Some of these obvious equivalents are disclosed herein, other obvious equivalents will immediately occur to one skilled in the art and still other obvious equivalents could be readily ascertained upon rather simple, routine, non-inventive experimentation. Certainly no invention would be involved in substituting one or more of such obvious equivalents for the materials specifically recited in the claims. I intend that all such obvious equivalents be encompassed within the scope of this invention and patent grant in accordance with the well-known doctrine of equivalents, as well as changed proportions of the ingredients which do not render the composition unsuitable for the disclosed purposes.

What I claim is:

1. An improved method for incorporating solid additives in vinyl chloride polymers consisting of vinyl chloride and up to 30% by weight of a copolymerizable monomer, which comprises:

a. introducing the monomers to be polymerized into a first zone together with insoluble solid additives having a particle size within the range 0.01 – 20 μm and carrying out mass polymerization to a conversion up to 20%, b. adding water and other water-soluble polymerization aids to the products of step a, and c. carrying out suspension polymerization until the desired degree of conversion of the monomers has been obtained.

2. An improved method for incorporating solid additives in vinyl chloride polymers consisting of vinyl chloride and up to 30% by weight of a copolymerizable monomer, which comprises:

a. introducing the monomers to be polymerized into a first zone together with between 10 and 60% by weight based on the monomers present of insoluble solid additives having a particle size within the range 0.01 – 20 μm and carrying out mass polymerization to a conversion up to 20%, b. adding water and other water-soluble polymerization aids to the products of step a, and c. carrying out suspension polymerization until the desired degree of conversion of the monomers has been obtained.

* * * * *